United States Patent [19]
Schoellmann

[11] Patent Number: 6,050,663
[45] Date of Patent: *Apr. 18, 2000

[54] SHELF SYSTEM FOR COLD STORAGE COOLER

[76] Inventor: Lester A. Schoellmann, R.R. 1, Box 39A, County Road 113, Garwood, Tex. 77442

[ * ] Notice: This patent issued on a continued prosecution application filed under 37 CFR 1.53(d), and is subject to the twenty year patent term provisions of 35 U.S.C. 154(a)(2).

[21] Appl. No.: 08/694,996

[22] Filed: Aug. 9, 1996

Related U.S. Application Data

[63] Continuation of application No. 08/694,996, Aug. 9, 1996.

[51] Int. Cl.[7] .................................................. A47B 57/00
[52] U.S. Cl. ...................... 312/408; 220/23.86; 312/351
[58] Field of Search .............................. 220/23.83, 23.86, 220/408, 410, 625; 312/351, 229, 408; 211/181; 248/346.01; 126/25 R, 41 R

[56] References Cited

U.S. PATENT DOCUMENTS

| | | |
|---|---|---|
| 161,296 | 3/1875 | Tewksbury .......................... 248/346.01 |
| 377,306 | 1/1888 | Illoway ................................ 220/23.83 |
| 2,297,859 | 10/1942 | Anderson .......................... 220/23.83 X |
| 3,589,554 | 6/1971 | Smith .................................. 220/23.83 |
| 3,756,681 | 9/1973 | Croston ............................... 312/229 X |
| 4,200,346 | 4/1980 | Belokin, Jr. ......................... 312/229 X |
| 4,317,527 | 3/1982 | Belleville ................................ 220/4 F |
| 4,577,475 | 3/1986 | Herrera ..................................... 62/457 |
| 4,696,412 | 9/1987 | McGowan et al. ...................... 220/335 |
| 4,932,677 | 6/1990 | Shustack ................................ 280/28.5 |
| 4,979,437 | 12/1990 | Giebel .............................. 126/25 R X |
| 5,048,505 | 9/1991 | Hait ....................................... 126/9 R |
| 5,226,706 | 7/1993 | Tuller .................................. 312/229 X |
| 5,350,215 | 9/1994 | DeMars .................................. 297/194 |

Primary Examiner—Peter M. Cuomo
Assistant Examiner—Stephen Vu
Attorney, Agent, or Firm—Howrey Simon Arnold & White, LLP

[57] ABSTRACT

A shelving system for storing food and other perishable items in a portable insulated container is described. The shelf assembly is positioned in the closed volume of a portable insulated container and securely maintains the stored items above the level of ice and water which typically is present in the lower portion of the closed volume. The system may be adjustable in width, length and height to fit a variety of sizes of containers.

19 Claims, 3 Drawing Sheets

SHELF SYSTEM FOR COLD STORAGE COOLER

This is a continuation of co-pending application Ser. No. 08/694,996, filed Aug. 9, 1996.

BACKGROUND OF THE INVENTION

1. Field of the Invention

The present invention relates generally to shelf storage systems and, more particularly, to a removable support frame for use in storing food items within a portable insulated storage container.

2. Description of the Prior Art

For many years, portable insulated storage containers, or ice chests, have been used to keep food items and other perishable or temperature-sensitive material cool. These containers are particularly useful during transportation of such material, or where electricity is not readily available. Typically, the insulated, enclosed portion of these containers is filled with ice, along with the food, beverages, or other items which are to be kept cold. As the ice begins to melt, a mixture of ice and water forms in the bottom of the insulated container. Unsupported food or other material in the container is then exposed to this ice and water solution. Often, the food or other material will become saturated with water and unsuitable for use.

Some prior art containers have generally utilized a small rectangular tray or basket suspended from the upper portion of the container to be used in keeping the food or other material away from the ice and water solution. While such devices are generally acceptable for their intended purpose, they have not proven to be entirely satisfactory in that the volume of food that may be stored is limited by the size of the tray or basket, which may be quite small in relation to the overall size of the container, the tray or basket is not adjustable to accommodate different levels of the ice and water mixture in the bottom of the container, and the tray or basket is not supported in the container in a manner that enables it to support a large amount of weight. In addition, use of the prior art containers may result in the food or other material in the tray or basket being stored in what is typically the warmest part of the container, very near the uncooled lid and unnecessarily far from the ice and water at the bottom.

As a result of the shortcomings of the prior art, typified by the above, there has developed and continues to exist a substantial need for a storage system that provides a large storage area above the bottom of such a container but close enough to the ice in the bottom of the container to provide maximum cooling of the stored material, is adjustable to accommodate varying levels of ice and water, and is capable of supporting a large amount of weight while at the same time allowing easy access to the ice and water so that items which are not harmed by direct exposure to the water, i.e., cans or bottles, may be easily stored and retrieved. Despite this need, such a support frame has heretofore been unavailable.

SUMMARY OF THE INVENTION

It is, therefore, a feature of the present invention to provide a removable support frame to be installed within an insulated container which will support food or other material above the bottom of the container.

It is another feature of this invention to provide a food storage pan which may be used to contain the food supported by the support frame. A still further feature of the present invention is that the legs of the support frame may be adjusted to vary the height of the top portion of the support frame above the bottom of the container.

An additional feature of the invention is that the length and width of the support frame may be adjusted to fit various sizes of insulated containers.

Finally, a feature of the present invention is that the legs of the support frame may be folded up and the support frame may be easily stored when not in use.

The present invention is advantageous over the prior art in that the same is capable of supporting a larger volume and weight of material above the bottom of the container, and may be adjustable in height, length, and width to accommodate various sizes of containers and various levels of the ice and water solution.

The present invention is summarized in that a removable support frame is provided to be positioned within an insulated container, allowing food or other material to be stored above the bottom of the container. The support frame includes at least three legs and a top support surface assembly attached to the legs.

So that the manner in which the above-recited advantages and features of the present invention, as well as others which will become apparent, are attained and can be understood in detail, a more particular description of the invention, briefly summarized above, may be had by reference to the embodiments that are illustrated in the appended drawings, such drawings form a part of this specification.

It is to be noted, however, that the appended drawings illustrate only typical embodiments of the invention and are, therefore, not to be considered limiting of its scope, for the invention may admit of other equally effective embodiments.

DESCRIPTION OF ILLUSTRATIVE EMBODIMENTS

Referring now to FIGS. 1–4, illustrative embodiments of a removable support frame of the present invention are shown and described.

Figure 1:
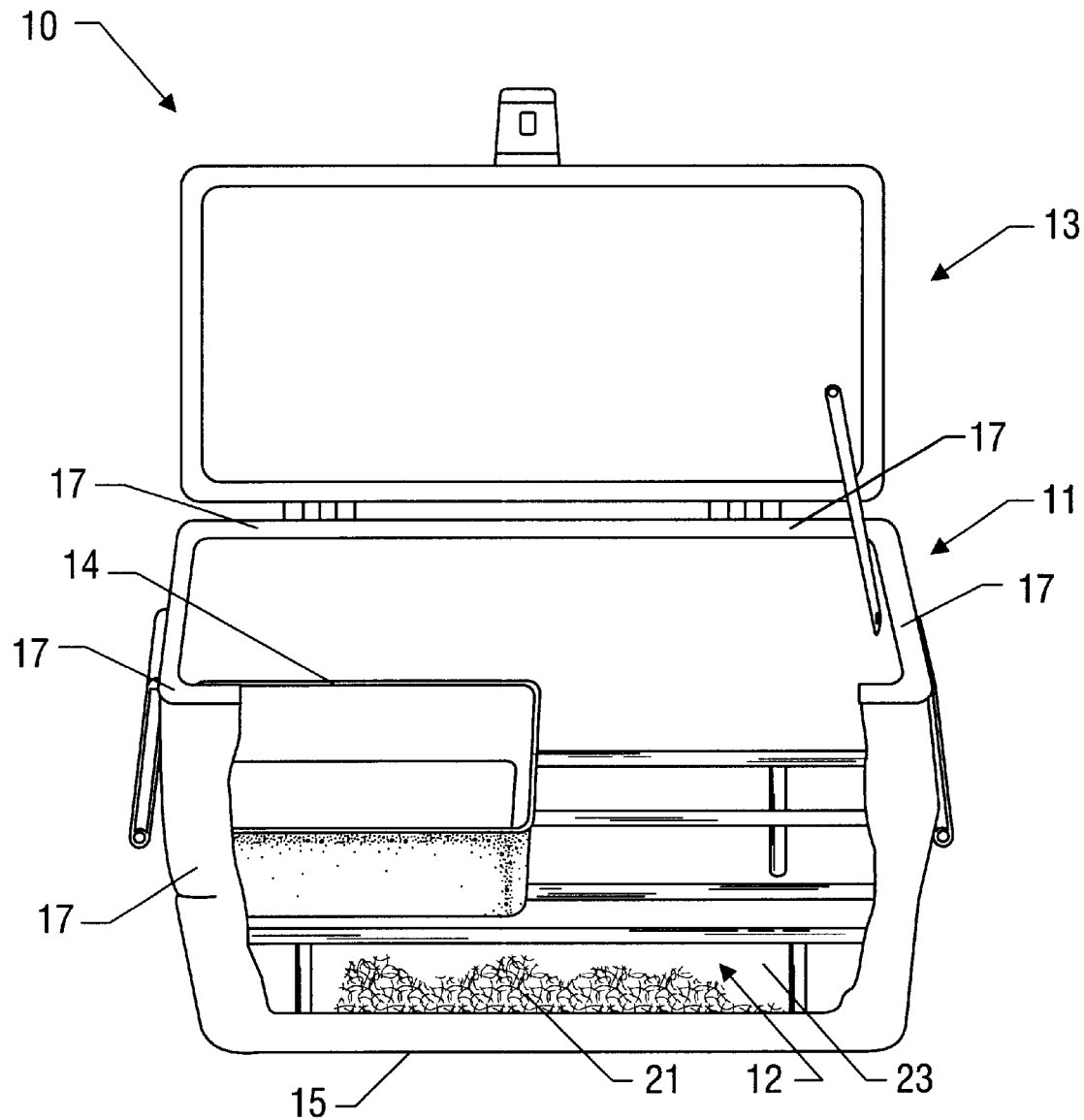
FIG. 1 is a perspective view of a typical installation of a support frame built according to the present invention, within a typical insulated container, and supporting a food storage pan, a portion of the container broken away for viewing the frame.

Referring first to FIG. 1, an insulated container, defined as an ice chest, with the removable support frame installed is shown and described. The container 10 may be any type of readily available insulated container such as those presently manufactured under the trademarks IGLOO or COLEMAN. Container 10 includes a base 11 and lid 13 which can be positioned on the base 11 to form an enclosed volume. Container 10 may have various shapes and sizes with the lid 13 being hinged to base 11 or totally removable. The embodiment of FIG. 1 is a container with a base 11 having a bottom 15 and four side portions 17. Support frame 12 is positioned within the enclosed volume of container 10 and ice 21 being placed below frame 12 in bottom area 23. Food storage pan 14 may be placed on the support frame 12, to enable the storage of food or other material which may be damaged by an ice and water mixture within the container 10.

Figure 2:
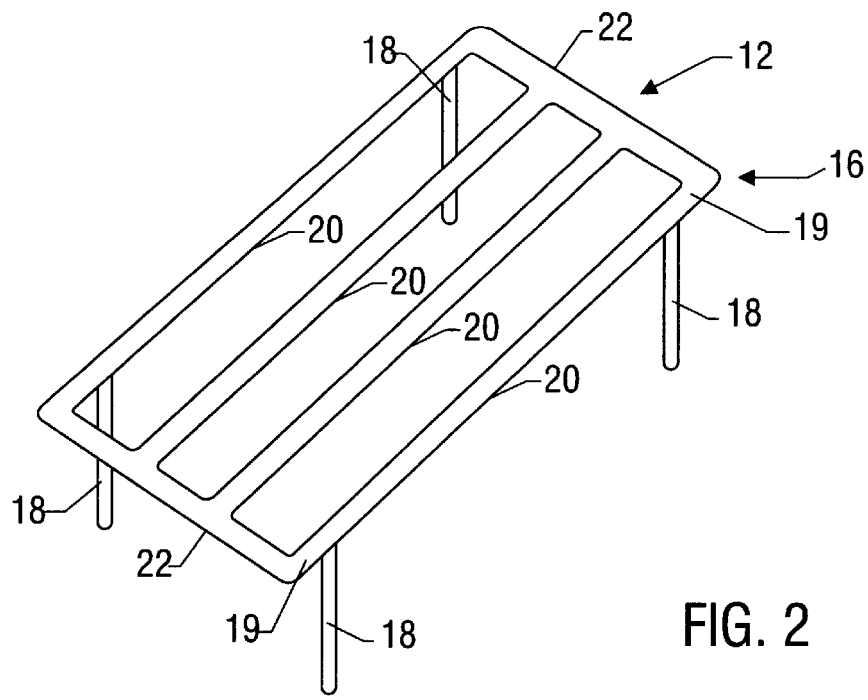
FIG. 2 is a perspective view of a support frame built according to the present invention.

Referring next to FIG. 2, one embodiment of the support frame 12 is shown. The support frame 12 includes a top surface assembly 16 and four legs 18. The support frame 12 may be constructed of plastic, such as PVC pipe, metal, or any other material suitable for supporting weight. The top surface assembly 16 is coupled to each of the four legs 18 such that the legs 18 support the weight of the top surface assembly 16 and any material placed on the support frame 12. The top surface assembly 16 may include longitudinal support members 20 and transverse support members 22. In the present embodiment, the legs 18 are rigidly coupled to the longitudinal support members 20 by gluing, welding, or otherwise rigidly fastening. The longitudinal support members 20 extend substantially horizontally beyond each point at which the legs 18 attach to form projecting portion 19, thus allowing the support frame 12 to fit within a container having tapered sides, as many commonly available insulated containers have. A pair of adjacent longitudinal support members 20 may be spaced apart sufficiently that a user's hand can easily fit between them, as for example 4 to 6 inches, thus providing easy access for retrieval of ice or other material (such as a can of soda or beer) from below the support frame 12.

Figure 3:
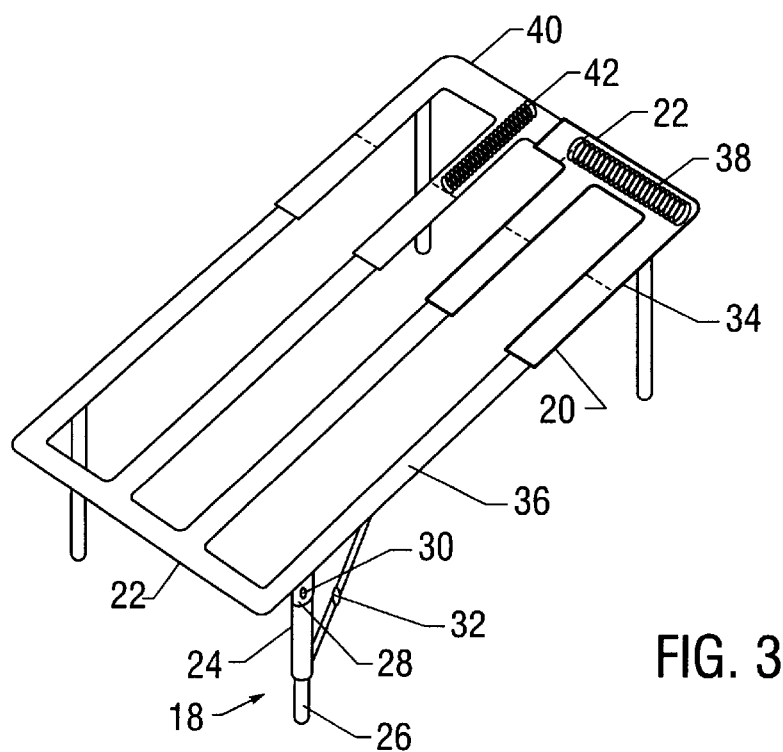
FIG. 3 is a perspective view of a support frame built according to a second embodiment of the present invention.

Referring now to FIG. 3, a support frame of a second embodiment of the present invention which includes adjustable length legs is shown and described. In this embodiment, legs 18 may include an upper leg member 24 and a leg extension 26 (shown on near leg only). Leg extension 26 may be threadedly inserted into upper leg member 24, so that the length of leg extension 26 that protrudes out of upper leg member 24 is adjusted by rotating leg extension 26, thus allowing the distance from the top surface assembly 16 to the bottom of the leg 18 to be adjusted to obtain the desired height of the top surface assembly 16. It will be readily apparent that other means for varying the length of legs 18 may be used and for retaining leg extension 26 in a fixed position relative to upper leg member 24, such as a telescoping extension.

In this embodiment, each leg may also be rotatably coupled to the top surface assembly 16, to allow the legs 18 to be folded up (shown at near location only). A leg attachment bracket 28 is attached to the underside of the top surface assembly 16 at each point where attachment of a leg 18 is desired. A leg attachment pin 30 connects the leg attachment bracket 28 to the upper end of leg 18. Hinged leg support brace 32 may be coupled to the leg 18 and to the top surface assembly 16, providing additional stability when the leg 18 is placed in the extended position.

In this embodiment, each longitudinal support member 20 may include a longitudinal outer tube section 34 and a longitudinal inner tube section 36. Longitudinal inner tube 36 may be inserted into longitudinal outer tube 34 to a variable depth, allowing the length of top surface assembly 16 to be adjusted to fit various length containers. Likewise, each transverse support member 22 may include a transverse outer tube 38 and a transverse inner tube 40 (shown at far end only). Transverse inner tube 40 may be inserted into transverse outer tube 38 to a variable depth, allowing the width of top surface assembly 16 to also be adjusted to fit various width containers.

As a further feature, the top surface assembly 16 may be made capable of adjusting automatically within a given range to fit insulated containers of various sizes. This feature may be accomplished by installing springs internally of the longitudinal or transverse members 20, 22, such that each may be said to be spring biased into a larger size. For example, the top surface assembly 16 may be manually compressed such that the overlap between the longitudinal outer tube 34 and the longitudinal inner tube 36 and the overlap between the transverse outer tube 38 and the transverse inner tube 40, respectively, are increased to a point where the top surface assembly 16 is small enough in length and width to fit within the desired insulated container. If springs 42, 44 are mounted within tubular members 20, 22 such that when tube sections 34, 36 are telescoped together springs 42, 44 are compressed, the length of the assembly 16 is "automatically" extended until it abuts the end portions of the container base 11. This manual compression creates a tensile force in longitudinal spring 42 and transverse spring 44. The support frame 12 may then be placed within the desired container, and the compressive force removed. The tensile forces in longitudinal spring 42 and the transverse spring 44 then cause the top surface assembly 16 to expand in length and width, respectively, to fit the container. Alternatively, the springs 42 and 44 may be omitted, and the length and width of the top surface assembly 16 may be manually adjusted. In this such embodiment, the fit between the longitudinal outer tube 34 and the longitudinal inner tube 36, and the fit between the transverse outer tube 38 and the transverse inner tube 40 should be relatively tight, such that the frictional force between the respective inner and outer tubes is sufficient to maintain the length and width of the top surface assembly 16 constant during use, or some readily available locking device may be employed such as set screws or spring biased tabs and corresponding holes.

Figure 4:
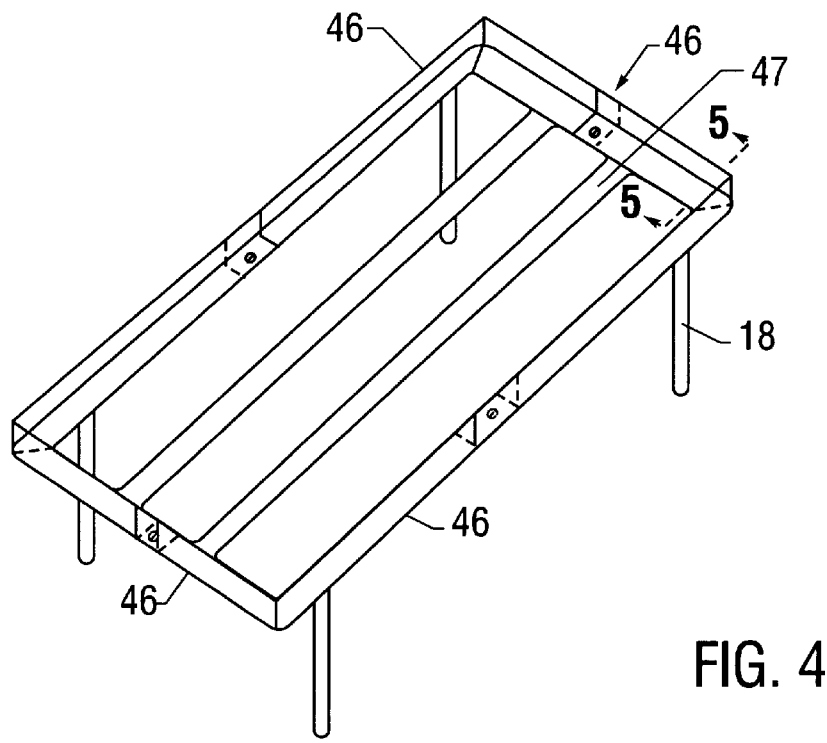
FIG. 4 is a perspective view of a support frame built according to a third embodiment of the present invention.
Figure 5:
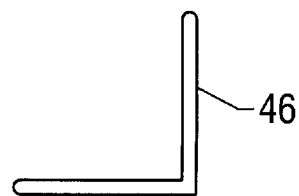
FIG. 5 is a cross-section of a portion of the invention taken along line 5—5 of FIG. 4.

Turning now to FIGS. 4 and 5, a support frame of a further embodiment of the present invention is shown and described. In this embodiment, the top surface assembly 16 includes upwardly extending perimeter edge members 46 and flat longitudinal support members 47. In this embodiment, legs 18 may be of any cross-sectional shape, such as round, square, or L-shaped, similar to the upwardly extending perimeter edge members 46. The upwardly extending perimeter edge members 46 may be formed from ordinary structural steel angle, or may be formed from aluminum, plastic, or other material of a similar cross-sectional shape. Further, each edge of the top surface assembly 16 may include two perimeter edge members 46 which overlap as shown to provide adjustability in length and width of the top surface assembly 16, in a manner similar to that discussed for the tube members above.

It can, therefore, be appreciated that the shelf system for cold storage cooler according to the present invention exhibits numerous advantages while providing a removable support frame for supporting food or other material within an insulated container. The various embodiments and modifications according to this invention facilitate the storage of a large amount of food or other material close to the source of cooling the container, and provide flexibility to fit various sizes of containers.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of use of other features, all as would be apparent to one skilled in the art after having the benefit of this description of the invention.

What is claimed is:

1. An ice chest for storing food items comprising:

an ice chest base comprising insulating material and having a bottom and four side portions;

a lid positioned on the base to contact the four side portions and form a closed volume for retaining the food items within the ice chest; and a removable support frame to be positioned in the closed volume on the bottom portion of the base for retaining the food to be stored in an elevated position above said bottom portion, said support frame comprising a top surface assembly having spaced longitudinal support members and at least three legs extending downwardly from said top surface and contacting said bottom portion such that said top surface assembly is supported above the base bottom portion.

2. The ice chest of claim 1 further including a food storage pan having a width substantially equal to the width of the top surface assembly and a length less than one half of the length of the top surface assembly.

3. The ice chest of claim 1, wherein the top surface assembly an opening providing access to the space below.

4. The container of claim 1, wherein the legs are pivotally attached to said top surface assembly whereby said support frame may be easily stored when not in use.

5. The container of claim 1, wherein the length of the legs may be adjusted to vary the height of the top surface assembly above the base bottom portion.

6. The container of claim 1, wherein the top surface assembly comprises upwardly extending perimeter edge members.

7. The ice chest of claim 1, wherein at least two adjacent longitudinal support members are spaced apart sufficiently that a user's hand may easily pass between said two support members.

8. A removable support frame in combination with an insulated food container, said frame being positioned within the enclosed volume of said insulated food container having a bottom portion, the frame for maintaining food to be stored in an elevated position above the bottom portion, said frame comprising a top surface assembly having spaced longitudinal support members and at least three legs extending downwardly from said top surface assembly such that said top surface assembly is supported above the bottom portion.

9. The support frame of claim 8, wherein the top surface assembly includes an opening providing access to the space below.

10. The support frame of claim 8, wherein the legs are pivotally attached to said rack and whereby said support frame may be easily stored when not in use.

11. The support frame of claim 8, wherein the length of the legs may be adjusted to vary the height of the rack above the bottom portion.

12. The support frame of claim 8, wherein the top surface assembly comprises upwardly extending perimeter edge members.

13. The support frame of claim 8, wherein at least two adjacent longitudinal support members are spaced sufficiently that a user's hand may easily pass between said two support members.

14. The support frame of claim 8, wherein the top surface assembly extends in at least one horizontal direction beyond the point at which the leg attaches to the top surface assembly, to facilitate use in an insulated container that is tapered such that the cross-sectional area of the container at said elevated position is greater than the cross-sectional area at the bottom portion.

15. The support frame of claim 8, wherein the length of said longitudinal support members is adjustable to facilitate use with various sizes of insulated containers.

16. The support frame of claim 8, wherein the rack further includes transverse members connecting said longitudinal support members, and wherein the length of said transverse members is adjustable to facilitate use with various sizes of insulated containers.

17. A removable support frame in combination with an ice chest, said frame being positioned within the enclosed volume of said ice chest having a bottom portion, the frame for maintaining food to be stored in an elevated position above the bottom portion, said frame comprising a top surface assembly having spaced longitudinal support members and at least three legs extending downwardly from said top surface assembly and contacting said bottom portion, such that said top surface assembly is supported above the bottom portion.

18. The support frame of claim 17, wherein the top surface assembly includes an opening providing access to the space below.

19. The support frame of claim 17, wherein at least two adjacent longitudinal support members are spaced sufficiently that a user's hand may easily pass between said two support members.

* * * * *